United States Patent
Verkuijl et al.

(10) Patent No.: US 7,713,000 B2
(45) Date of Patent: May 11, 2010

(54) METHOD AND DEVICE FOR POSITIONING ENDS OF PIPE SECTIONS RELATIVE TO ONE ANOTHER

(75) Inventors: Alexander Lambertus Johannes Verkuijl, Voorburg (NL); Pieter de Goede, Oostzaan (NL); Johannes Hendrik Adriaansen, Gouda (NL); Cornelis van Zandwijk, Waddinxveen (NL)

(73) Assignee: Heerema Marine Contractors Nederland B.V., Leiden (NL)

( * ) Notice: Subject to any disclaimer, the term of this patent is extended or adjusted under 35 U.S.C. 154(b) by 383 days.

(21) Appl. No.: 11/911,761

(22) PCT Filed: Apr. 20, 2005

(86) PCT No.: PCT/NL2005/000292
§ 371 (c)(1),
(2), (4) Date: Oct. 17, 2007

(87) PCT Pub. No.: WO2006/112689
PCT Pub. Date: Oct. 26, 2006

(65) Prior Publication Data
US 2008/0193218 A1 Aug. 14, 2008

(51) Int. Cl.
*B23K 9/00* (2006.01)
*F16L 1/235* (2006.01)

(52) U.S. Cl. ..................... 405/170; 405/158
(58) Field of Classification Search ........... 405/158, 405/166, 167, 168.1, 169, 170, 184.4, 184.5
See application file for complete search history.

(56) References Cited

U.S. PATENT DOCUMENTS

| 3,780,421 A | 12/1973 | White, Jr. et al. |
| 4,468,155 A | 8/1984 | Levallois et al. |

(Continued)

FOREIGN PATENT DOCUMENTS

DE 19618662 A1 11/1997

(Continued)

*Primary Examiner*—Tara Mayo-Pinnock
(74) *Attorney, Agent, or Firm*—Hoffmann & Baron, LLP

(57) ABSTRACT

The invention relates to a method for positioning an end (19) of a first pipe section (14) relative to an end (20) of a second pipe section (18), the method comprising: (a) prepositioning the end (19) of the first pipe section (14) near the end (20) of the second pipe section (18), defining a connection area (51) comprising the respective ends (19, 20) of the first and second pipe sections (14, 18); (b) performing a measuring process comprising a plurality of measuring steps, each measuring step comprising: (b1) moving a sensing device (86) to a location (89*a*, 89*b*, 89*c*) near the connection area (51); (b2) automatically measuring the location (89*a*, 89*b*, 89*c*) of the sensing device (86) relative to a reference location (87); (b3) automatically measuring point positions (98*a*, 98*b*, 98*c*, 98*d*) of points on the ends (19, 20) of the first and second pipe sections (14, 18) relative to the sensing device location (89*a*, 89*b*, 89*c*); (c) determining a target position of the end (19) of the first pipe section (14) relative to the end 20) of the second pipe section (18) on the basis of the measured point positions (98*a*, 98*b*, 98*c*, 98*d*); and (d) moving at least one of the first and second pipe sections (14, 18) in order to obtain the target position.

21 Claims, 9 Drawing Sheets

U.S. PATENT DOCUMENTS

| | | |
|---|---|---|
| 6,761,506 B2 * | 7/2004 | De Lang et al. .......... 405/168.3 |
| 7,114,881 B2 * | 10/2006 | Belloni et al. ............... 405/170 |
| 2004/0009042 A1 * | 1/2004 | Belloni et al. ............... 405/170 |
| 2005/0036842 A1 | 2/2005 | Stockstill |
| 2008/0193218 A1 * | 8/2008 | Verkuijl et al. .............. 405/158 |
| 2008/0292405 A1 * | 11/2008 | Roodenburg et al. ........ 405/166 |

FOREIGN PATENT DOCUMENTS

| | | |
|---|---|---|
| RU | 2230967 C2 | 6/2004 |
| WO | 00/05525 A2 | 2/2000 |

* cited by examiner

METHOD AND DEVICE FOR POSITIONING ENDS OF PIPE SECTIONS RELATIVE TO ONE ANOTHER

CROSS-REFERENCE TO RELATED APPLICATIONS

This application is the National Stage of International Application No. PCT/NL2005/000292, filed Apr. 20, 2005, the contents of which is incorporated by reference herein.

FIELD OF THE INVENTION

The present invention relates to a method and device for positioning an end of a first pipe section relative to an end of a second pipe section. Methods and device for positioning pipe sections relative to one another are known in the art. The present invention relates in particular to the positioning of a pipe section relative to a pipeline which is laid at sea.

When a pipeline is constructed, pipe sections are positioned in and end-to-end relationship and connected to one another. When the pipeline is made of a metal, the pipe sections are generally welded to the pipeline.

During the laying of a pipeline at sea, the pipeline is suspended by a free end thereof from a pipe-laying vessel. The pipeline extends from the pipe-laying vessel to a seabed, and is lowered to the seabed each time a new pipe section has been connected to the pipeline. The pipe-laying vessel gradually moves along the envisaged trajectory of the pipeline as the length of the pipeline increases. The sea may have a substantial depth, in which case a substantial length of pipeline is suspended from the pipe-laying vessel. The pipeline is generally of metal, preferably steel, and therefore the length of pipeline extending between the pipe-laying vessel and the seabed can have a substantial weight, causing substantial tensions in the pipeline.

The pipe sections which are to be welded to the pipeline have slightly variable dimensions. In case of a circular pipeline cross-section, the cross-section may for instance be slightly oval. Also, the pipe wall may not always have a constant thickness along the circumference of the pipe section. Other variations of the dimensions, for instance local irregularities, may also occur.

When the pipe section is to be welded to the pipeline, the pipe ends to be joined together do not have exactly the same dimensions. During the connecting of the pipe section to the pipeline, it is crucial that the end of the pipe section fits onto the end of the pipeline as well as possible. If the pipe section is connected to the pipeline when the ends of the pipe section and the pipeline do not fit very well, this will result in a locally abrupt transition of the wall of the resulting pipeline at the connection location, also indicated in the art as 'high-low' or eccentricity. The abrupt transition may occur on the outer wall of the pipeline and/or on the inner wall of the pipeline.

In its final stage, the pipeline must often be connected to an object located at the water level. This means that the pipeline which rests on the seabed, must rise from the seabed and extend towards the water level. In this final stage, the pipeline thus comprises a riser section extending between the seabed and the object, and a horizontal section, which rests on the seabed.

The riser section of a pipeline is subject to dynamic forces of current, eddies, and forces exerted on the riser section by the floating object due to movements thereof. In practice, fatigue of the riser section may occur at the connections of the pipe sections which form the pipeline. The fatigue plays an important role in the life expectancy of the pipeline.

Local eccentricity between the connecting walls of adjoining pipe sections are a major cause of local stress concentration in the welds of the pipeline, in particular in a riser section of the pipeline. The stress concentrations cause local high stress peaks, resulting in an accelerated fatigue in the pipeline, and a corresponding reduction in life expectancy of the pipeline.

In order to prevent this accelerated fatigue, it is very important that the eccentricity (high-low) between walls of the ends of the pipe sections is minimized at the time of connection of the pipe section to the pipeline in order to provide a transition of the pipe wall which is as smooth as possible.

DESCRIPTION OF THE PRIOR ART

In the known art, an end of a pipe section is positioned against or close to the free end of the pipeline prior to the welding thereof. Next, the position of the end of the pipe section relative to the free end of the pipeline is measured. Currently, this is a manual process. An operator manually measures a position of a first point on the wall of the pipe section, and the position of a corresponding second point on a wall of the pipeline opposite to the first point. This measurement is manually performed at a number of positions along the circumference of the pipeline and the pipe section. Typically, the measurements are performed with a mechanical depth gauge, which is manually operated by the operator.

Next, the operator determines if the end of the pipe section and the end of the pipeline are positioned relative to one another according to the requirements, in which case the welding operation may begin and the pipe section is welded to the pipeline. If the end of the pipe section is not positioned properly relative to the end of the pipeline, the operator determines a required change in position of the pipe section relative to the pipeline on the basis of the measurements. The operator generally interprets the measurements on the basis of his personal insight. Subsequently, the pipe section is moved to the newly determined position.

Then, the procedure of manually measuring the position of the pipe section relative to the pipeline is performed again, and again it is determined by the operator whether the end of the pipe section fits well enough on the pipeline in order to make the connection.

In the known practice, this positioning procedure of a pipe section relative to the pipeline is a lengthy procedure, sometimes taking as much as half an hour per pipe section.

However, in pipe-laying operations at sea, time is expensive. Hourly rates of pipe-laying vessels are extremely high. This is due to the high operational costs of the pipe-laying vessel, and also due to the substantial number of highly skilled persons required on board the pipe-laying vessel in order to perform pipe-laying operations.

Therefore, the present method has a disadvantage in that it is very expensive. The present method has a further disadvantage in that it is difficult to determine a substantially complete view of the dimensional variations of the pipe section and the pipeline, which may result in a non-optimum connection between the pipeline and the pipe section.

SUMMARY OF THE INVENTION

It is an object of the present invention to provide a method and device for positioning an end of a first pipe section relative to an end of a second pipe section which requires less time than currently known methods. The second pipe section may be a pipeline or a part thereof.

It is another object of the present invention to provide a method and device for positioning an end of a first pipe section relative to an end of a second pipe section wherein a better positioning of the end of the first pipe section relative to the end of the second pipe section is obtained, resulting in a smoother transition of the wall of the resulting pipeline at the connection.

At least one of the above mentioned objects is reached in a method for positioning an end of a first pipe section relative to an end of a second pipe section, the method comprising:

(a) prepositioning the end of the first pipe section near the end of the second pipe section, defining a connection area comprising the respective ends of the first and second pipe sections;

(b) performing a measuring process comprising a plurality of measuring steps, each measuring step comprising:

(b1) moving a sensing device to a location near the connection area;

(b2) automatically measuring the location of the sensing device relative to a reference location;

(b3) automatically measuring point positions of points on the ends of the first and second pipe sections relative to the sensing device position;

(c) determining a target position of the end of the first pipe section relative to the end of the second pipe section on the basis of the measured point positions; and (d) moving at least one of the first and second pipe sections in order to obtain the target position.

The present invention provides an advantage in that the positioning of the end of the first pipe section relative to the end of the second pipe section can be performed considerably faster than in the known methods. Advantageously, human errors are reduced. Deviations in the position of the pipe sections relative to one another can be more accurately measured than in the known method.

Advantageously, variations in the form or dimensions of the ends of the first and second pipe section can be determined, and can be taken into account during the determining of the target position.

The target position of the pipe section can advantageously be attained more accurately in comparison with the known method, reducing eccentric transition differences at the connection.

Further, a documented scan of the relative positions of the first and second pipe section may be obtained, improving the interpretation of the measurements.

The prepositioning generally comprises an approximate aligning of the first and second pipe section.

The sensing device may be an optical sensing device, a mechanical sensing device or any other type of sensing device. The sensing device may be moved automatically or manually, as long as it is able to measure its position relative to a reference location automatically. The sensing device is typically moved along the circumference of the pipe sections, on the inside or outside thereof. The reference location is a location of which the position is known.

The ends of the pipe sections may engage one another in the target position.

Preferably, the second pipe section is, or is part of, a pipeline which is suspended from a pipe-laying vessel.

The pipeline may be laid at sea in a J-lay or an S-lay pipe-laying method, the second pipe section being the pipeline which is to be laid. The method according to the invention is also useful during the laying of pipelines by a pipe-laying vessel, since high stresses during pipelaying operations in combination with lengthy positioning procedures may consume a substantial part of the life expectancy of the pipeline, in particular of the riser section. The more accurate positioning method will help in reducing local stress peaks; the faster positioning method will help reducing the time the suspended pipeline is subjected to high installation stresses.

In a preferred embodiment, step (a) comprises positioning an end face of the first pipe section and an end face of the second pipe section at a small distance from one another, thereby providing a gap between the respective end faces.

When the first and second pipe sections are positioned at a small distance from one another, the sensing device can measure points on both the ends of the respective pipe sections from a single location of the sensing device. Also, the pipe sections may be moved relative to one another without grinding against one another. In an aspect of the invention, the ends of the first and second pipe sections define a circumferential groove, wherein at least some of the points are situated in the circumferential groove.

In an aspect of the invention, the ends of the first and second pipe section have a bevel-form defining a nose tip, wherein at least some of the points are situated on the respective nose tips.

Measuring points on the nose tip advantageously enables the inner walls of the respective pipe sections to be aligned with one another. The bevel-forms are manufactured prior to the welding process, and due to the manufacturing process, the thickness of the nose tip itself is rather constant and shows only minor variations. Measuring the position of a point on the nose tip therefore provides rather reliable information of the position of the inner walls of the respective pipe sections. When the requirements as to the allowable high-low are very extreme—which may for instance be the case in riser sections—additionally also the thickness of the nose tips may be measured and added to the procedure, thus providing even more accurate information about the position of the inner walls of the respective pipe sections.

In a preferred embodiment, step (a) comprises connecting an annular rail to the first or second pipe section, the sensing device being connected to the rail for movement along the connection area. This embodiment provides a very simple and effective way of performing the measurements.

In an aspect of the invention, step (b) comprises measuring a first point position on the end of the first pipe section and measuring a second point position on the end of the second pipe section, the first and second points being located opposite one another on either side of the connection area, wherein a subsequent step (c) comprises determining for each sensing device location a distance between the first and second point position and determining the target position for the pipe section on the basis of the determined distances.

The first and second point form a pair of points and by measuring pairs of points and determining the respective distances between the points, a good insight in the relative positions of the pipe sections can be obtained. The first and second points are preferably located very close to the connection area.

In an aspect of the invention said distance is chosen from a group of distances, comprising:

a radial distance between a first point on an outer wall of the first pipe section and a second point on an outer wall of the second pipe section;

a radial distance between a first point on a nose tip of the first pipe section and a second point on a nose tip of the second pipe section; and a radial distance between a first point on an inner wall of the first pipe section and a second point on an inner wall of the second pipe section; and a distance parallel to a central longitudinal axis between a first point and a second point.

These distances provide a good insight into the relative positions of the ends of the first and second pipe sections. Further, the smoothness of the transition of the pipe walls at the connection location is dependent on the radial distances between the points on the first pipe section and the respective corresponding points on the second pipe section. Controlling the positioning process on the basis of these radial distances therefore provides a good basis for increasing the smoothness in the transition.

The walls of the respective pipe sections should preferably be aligned with one another along the circumference of the first and second pipe sections, for which purpose it is advantageous to measure points on the wall of the first and second pipe sections.

In an aspect of the invention, the points are situated on both the respective pipe ends, the points being situated at intervals from one another along an axis extending substantially transversally to the connection area.

For each location of the sensing device at the connection area, a profile of the pipe walls on both sides of the weld which is to be created can thus be obtained, preferably including a profile of the welding groove itself. This advantageously provides a substantially complete image of the respective positions of the pipe ends at that location, including variations in the form of the pipe sections.

In an aspect of the invention, step (b) comprises moving the sensing device at a substantially fixed distance from an outer or inner wall of the first or second pipe section along said wall.

In this way the point positions can be effectively measured around the circumference of the pipe sections.

In an aspect of the invention, at least one step (c), in particular a first step (c) comprises determining a target position wherein an end face of the first pipe section is substantially parallel to an end face of the second pipe section.

Advantageously, in subsequent steps, points on both pipe ends which are located opposite to one another at same respective distances from the respective end faces can be easily measured.

In an aspect of the invention, step (c) further comprises:
(c11) determining different candidate target positions;
(c12) determining an optimization value for each candidate target position; and
(c13) comparing the respective optimization values with a criterion and selecting the target position from the candidate target positions on the basis of the results of the comparison.

This embodiment provides the advantage that different candidate target positions are compared with one another, for selecting the target position which leads to the best fit between the ends of the first and second pipe section. In an aspect of the invention, steps c11 and c12 are automatically performed using a data processing means.

In an aspect of the invention, the criterion is chosen from a group of criteria, comprising:
minimizing radial distances between the first points on the outer wall of the first pipe section and the second points on the outer wall of the second pipe section at the respective locations;
minimizing radial distances between the first points on the inner wall of the first pipe section and the second points on the inner wall of the second pipe section at the respective measurement locations; and
minimizing a group of radial distances, the group comprising the radial distances between the points situated on the inner wall of the first pipe section and the corresponding points situated on the inner wall of the second pipe section at the respective measurement locations and the radial distances between the points situated on the outer wall of the first pipe section and the corresponding points situated on the outer wall of the second pipe section at the respective measurement locations.

Advantageously, stress conditions in the resulting pipeline can be optimized by minimizing these distances.

In an aspect of the invention, step (c) comprises: determining a first form of the end of the first pipe section and determining a second form of the end of the second pipe section, determining the position of the first form relative to the second form, and determining the target position on the basis of the first and second form and the relative positions thereof.

Advantageously a complete image of the variations in the form of the pipe ends is obtained, enabling the determination of a substantially ideal target position.

In an aspect of the invention, at least one step (c) comprises:
(c1) providing thickness data relating to a thickness of the pipe walls or the nose tip walls of the respective first and second pipe sections;
(c2) determining, on the basis of the wall thickness data or nose thickness data, for each sensing device location a position of a first opposite point located on an opposite side of the pipe wall or nose tip wall from the first point, and determining a position of a second opposite point located on an opposite side of the pipe wall or nose tip wall from the second point; and
(c3) determining the target position on the basis of the first and second opposite point positions or on the basis of a combination of the first and second point positions and the first and second opposite point positions.

Advantageously, the measurements can be performed along the outside of the pipe sections, while using the measurements for aligning the inner walls of the respective pipe sections with one another. Alternatively, the measurements may be performed from the inside of the pipe sections, while using the measurements for aligning the outer walls of the pipe sections with one another. Using wall thickness data is particularly useful in a second or further step (c).

Alternatively, the measurements may be performed from either the inside or the outside of the pipe sections, while using the measurements for aligning both the inner and outer walls as accurately as possible with one another.

In an aspect of the invention, in at least one step (c) a target position is selected which has either a minimal peak value of the radial distances at the respective sensing device locations, a minimal sum of the radial distances at the sensing device locations, or a minimal integral of the radial distances over at least a part of the circumference of the first and second pipe section.

Because there may be a large number of point positions which are measured, a method is preferably used which allows an incorporation of a substantial part of the measurement results in the determination of the target position. This is advantageously achieved in this embodiment.

In an aspect of the invention, step (d) comprises moving the at least one of the first and second pipe sections in a manner, chosen from a group of movements, comprising: a movement of the pipe section in a direction substantially parallel to a central longitudinal axis of said pipe section, a movement of the pipe section in a direction substantially transversal to the central longitudinal axis of said pipe section, a rotation of the pipe section about a first axis extending substantially transversally to the central longitudinal axis of said pipe section, and a rotation of the pipe section about a second axis extending substantially parallel to the central longitudinal axis of said pipe section.

These ways of movement of the pipes sections advantageously provide an efficient positioning.

In a further aspect of the invention, step (b) is performed at least two times, wherein between the first step (b) and the second step (b) at least one of the first and second pipe sections is rotated over a predetermined angle about a central longitudinal axis thereof, wherein in the first step (b) a first series of point positions is obtained, and wherein in the second step (b) a second series of point positions is obtained, and wherein step (c) comprises combining the first series of point positions with the second series of point positions for determining the target position.

If the sensing device is moved along an annular rail connected to one end of a pipe section, this annular rail itself may have a variable form due to variations in the form of the pipe section, and consequently have an unknown form. If the annular rail has an unknown form, the exact position of the sensing device is unknown.

This is no problem as long as pairs of points positions are measured at either side of the connection area, which is good enough when step (d) involves only movement of the pipe section in a direction substantially parallel to a central longitudinal axis of said pipe section, a movement of the pipe section in a direction substantially transversal to the central longitudinal axis of said pipe section and a rotation of the pipe section about an axis extending substantially transversally to the central longitudinal axis of said pipe section. For determining the target positions of all these movements, only the relative position data of the forms of both pipe ends are required. However, when also a target position for a rotation of the pipe section about an axis extending substantially parallel to the central longitudinal axis of said pipe section is to be determined, absolute data of the forms of both pipe ends are required. In order to obtain absolute data, step (b) is preferably carried out two times: the first time exactly as described before; the second time after a known axial rotation of both pipe ends with respect to each other. From both sets of measurements, the form of the annular rail itself can be determined, thereby enabling the determination of the absolute forms of both pipe ends.

In another aspect of the invention, in at least one step (d), in particular in a final step (d), at least one of the pipe sections is moved in order to close a gap (66) between the first and second pipe sections. After the pipe sections are positioned in such a way that the pipe walls are aligned as good as possible, the gap may be closed, and subsequently the weld can be made.

In a further aspect, the invention relates to a positioning system for positioning an end of a first pipe section relative to an end of a second pipe section, the device comprising:
  a support device configured for positioning the end of the first pipe section near the end of the second pipe section, defining a connection area comprising the respective ends of the first and second pipe sections, the support device comprising:
    at least one first moving device configured for moving at least one of the first and second pipe section;
    an input organ for input of a signal relating to a target position to which at least one of the first and second pipe sections is to be moved, the input organ being coupled to the first moving device;
  a sensing device configured for movement to different locations of the connection area, the sensing device being configured for automatically measuring each sensing device location relative to a reference location, wherein the sensing device is configured for automatically measuring point positions relative to the sensing device of different points on the ends of the first and second pipe sections at each sensing device location, wherein the sensing device comprises an output organ for output of the measured point positions and the measured sensing device locations; and
  a target position determining means being configured for input of the point positions and being configured for determining the target position on the basis of the point positions, the target position determining means further being configured for output of the target position.

Advantageously, the positioning system can substantially automatically measure the position of the end of the first pipe section relative to the position of the end of the second pipe section. This provides a cost-effective, accurate and simple way of positioning the ends of the pipe sections relative to one another.

In an aspect of the invention, the target position determining means comprises a data processing means configured for processing the point positions and performing the following steps:
  (c11) determining different candidate target positions;
  (c12) determining an optimization value for each candidate target position; and
  (c13) comparing the respective optimization values with a criterion and selecting the target position from the candidate target positions on the basis of the results of the comparison.

Advantageously, a large number of target positions can be compared, and the target position can be selected which fulfills the criterion best.

In an aspect of the invention, the target position determining means is coupled via coupling means to the output organ. This provides the advantage that the measured point positions can be automatically transmitted to the target position determining means.

In an aspect of the invention, the target position determining means is configured to generate a control signal on the basis of the determined target position, the control signal relating to a required movement of the moving device for obtaining the target position, wherein the target position determining means is coupled via coupling means to the input organ, for controlling the moving device.

In an aspect of the invention, the sensing device is configured for emitting a laser beam and sensing the position of a light point projected on the first or second pipe section. A laser measurement device has proved to be very effective in performing the measurements. With a laser, advantageously point positions can be measured of points located aside and inside the welding groove.

BRIEF DESCRIPTION OF THE DRAWINGS

FIG. 7A is a schematic side view of a J-lay assembly comprising a sensing device;

DETAILED DESCRIPTION OF PREFERRED EMBODIMENTS

Figure 1:
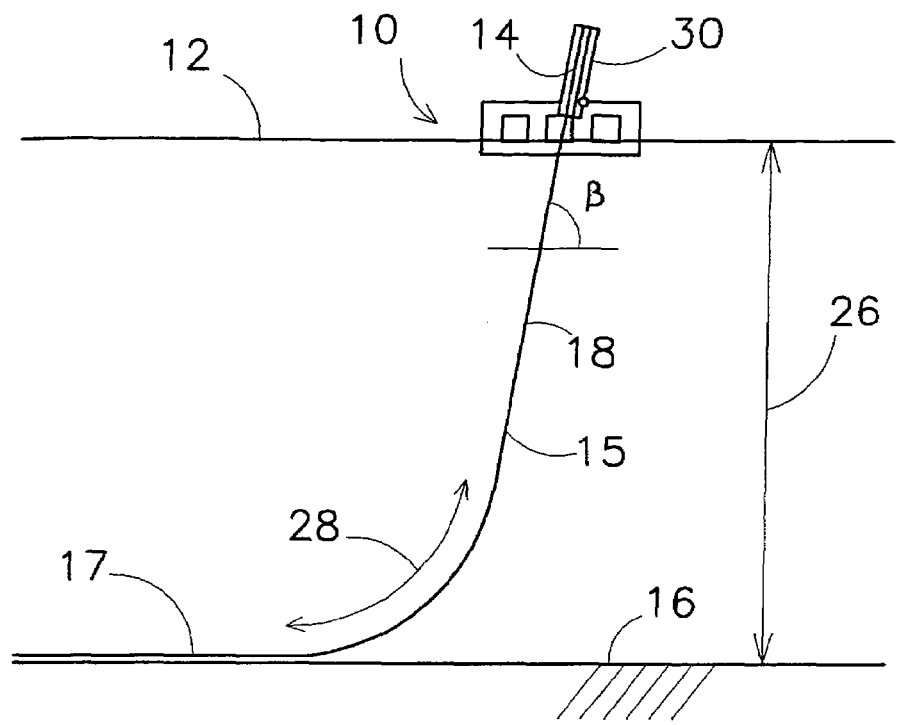
FIG. 1 is a schematic side view of a pipe-laying vessel laying a pipeline.
Figure 2:
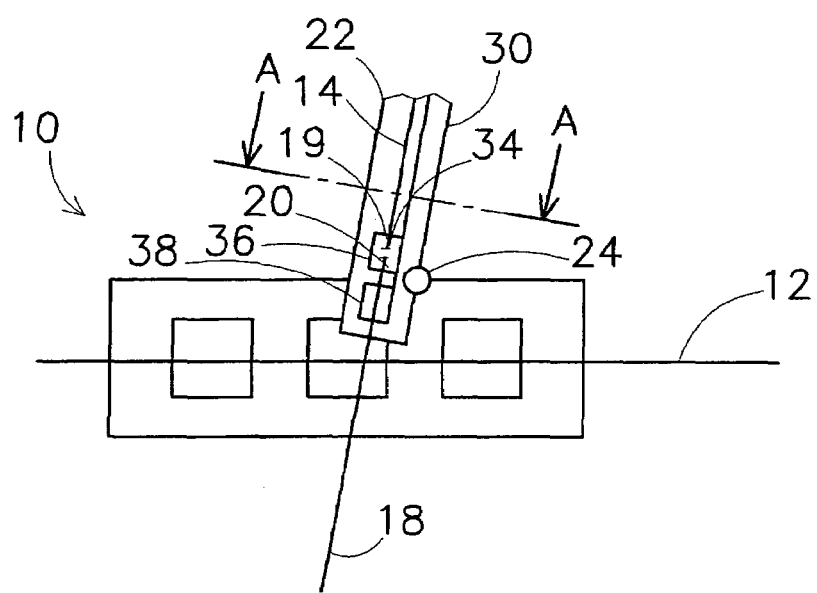
FIG. 2 is a schematic side view of the pipe-laying vessel of FIG. 1.

Referring to FIGS. 1 and 2, a pipe-laying vessel 10 is shown, which floats on a water surface 12. The pipe-laying vessel 10 comprises an inclined J-lay tower 30 which is connected by at least one hinge 24 to the pipe-laying vessel 10. The pipeline 18 is constructed by repeatedly welding pipe sections 14 to a free end 20 of the pipeline 18.

Depending on the water depth 26 and the submerged weight and stiffness of the pipeline 18, the tower 30 is set to an angle β with the horizontal, the angle β varying between 50 and 90 degrees.

During a J-lay operation, the pipeline 18 leaves the pipe-laying vessel 10 and extends in a J-shape between the pipe-laying vessel 10 and a seabed 16. A horizontal force is exerted on the free end 20 of the pipeline 18 by pipe-laying vessel 10 in order to prevent buckling of the pipeline 18 in the curved section 28 of the pipeline 18.

The process of adding a pipe section 14 to the pipeline 18 comprises a number of activities. First, the pipe section 14 is loaded onto the pipe construction ramp 22 which is located in the J-lay tower 30. Next, the lower end 19 of the pipe section 14 is positioned relative to the free end 20 of the pipeline 18 such, that a high quality weld 34 can be made. Subsequently, the weld 34 is made, connecting the pipe section 14 to the pipeline 18. After the laying of the weld 34, the weld 34 is inspected and approved. Finally, the weld is coated.

Usually, the positioning of the pipe section 14 relative to the pipeline 18, the welding and the inspection are performed in a first work station 36, and the coating operation is performed in a second work station 38. In most J-lay vessels, both the first and second work stations 36 and 38 are located along the main lay path, causing all steps of the process of adding a pipe section 14 to the pipeline 18 to be a determining factor in a critical time path.

Therefore, if a minimum cycle time of the connecting of a single pipe section is to be attained, all the respective activities should preferably be performed in a minimum time span, allowing for a minimum total cycle time of the add-on process.

The pipeline 18 comprises a riser section 15 extending between the seabed 16 and the pipe-laying vessel 10, and a horizontal section 17, which rests on the seabed 16. The riser section 15 of a pipeline 18 is subject to dynamic forces of current, eddies, and forces exerted on the riser section 15 by the floating object due to movements thereof. In practice, fatigue of the riser section 15 may occur at the connections of the pipe sections 14 which form the pipeline 18. The fatigue plays an important role in the life expectancy of the pipeline.

Figure 3:
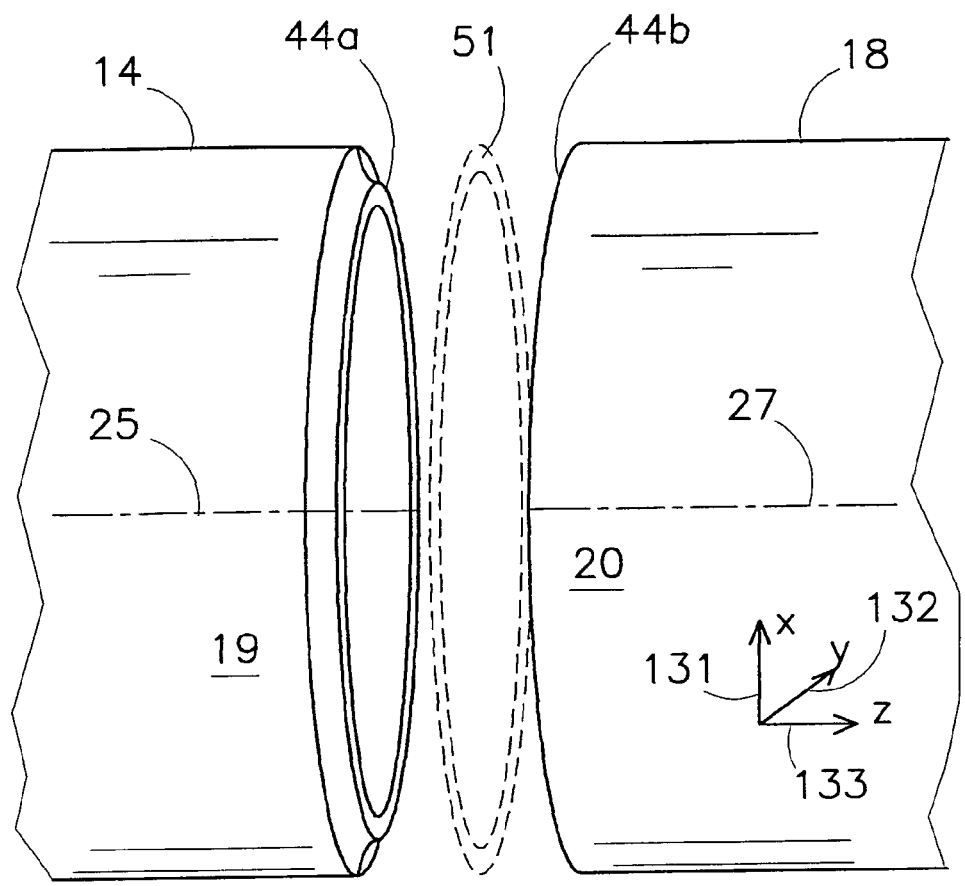
FIG. 3 is a schematic axonometric view of the relative positions of the pipe section and the pipeline.

Referring to FIG. 3, a connection area 51 is located at end faces 44a and 44b. A coordinate system is defined wherein the z-axis 133 extends substantially in the main longitudinal direction of the pipeline 18 and the pipe section 14.

Figure 4:
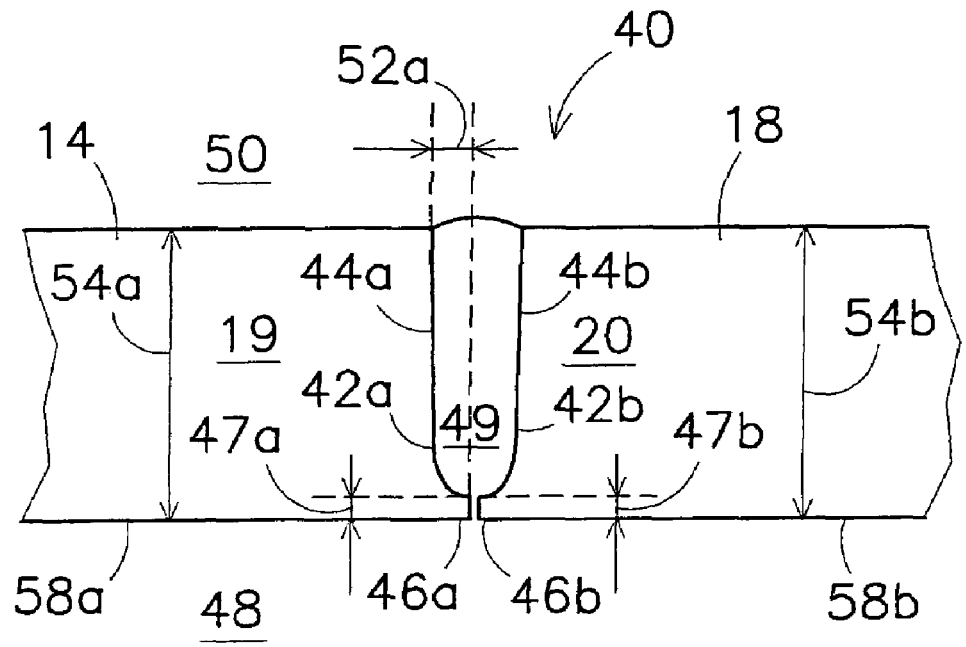
FIG. 4 is a detailed side view of respective walls of a first and second pipe section positioned near one another.

Referring to FIG. 4, a welding area 40 is shown, defined by respective ends 19, 20 of the pipe section 14 and the pipeline 18. In order to realize a minimal welding time, it is important that the weld volume is minimized. For this purpose, J-shaped bevel forms 42a, 42b are often used, comprising nose tips 46a, 46b located at the inner side 48 of the ends of the pipe section 14 and the pipeline 18. The end faces 44a, 44b of the pipe section 14 and the pipeline 18 have been processed prior to the welding process in order to create the required bevel forms 42a, 42b. When the ends 19, 20 of the pipe section 14 and the pipeline 18 are positioned near one another, a circumferential welding groove 49 is defined, extending along the outer circumference of the pipe section 14 and the pipeline 18. A typical width 52a of a bevel form 44a, 44b is 3-4 mm, thereby creating a total welding groove width of 6-8 mm.

The nose tips 46a, 46b have respective nose tips thicknesses 47a, 47b, which generally may be in the order of 1-2 mm. During the welding of a root weld, the nose tips 46a, 46b are welded together. The respective wall thicknesses 54a, 54b of the pipeline 18 and the pipe section 14 may typically be 15-40 mm.

Usually, the J-shaped bevels 42a, 42b are manufactured by a tool which uses the respective inner walls 58a, 58b of the pipe section 14 and the pipeline 18 as a reference position. Therefore, the bevel forms 42a, 42b will follow the inner walls 58a, 58b, and will also follow possible variations of the inner walls 58a, 58b relative to the theoretical values thereof, such as a deviation in the roundness of the inner walls 58a, 58b.

Figure 5:
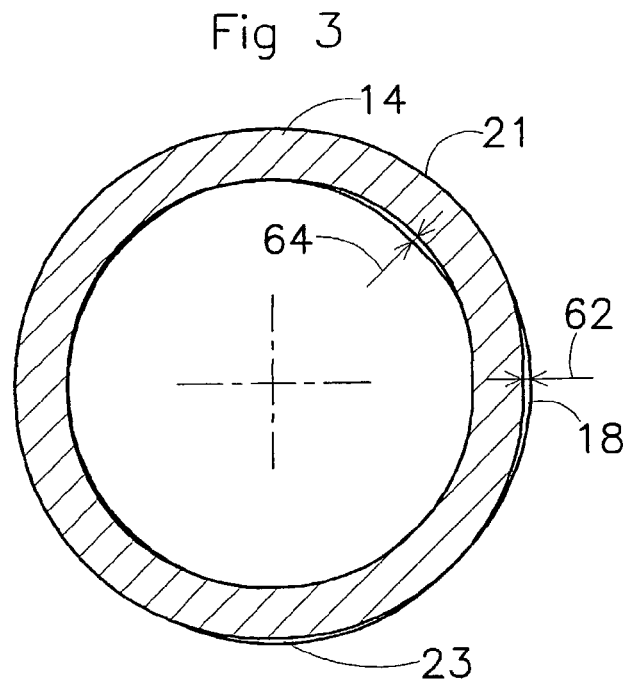
FIG. 5 is a cross-sectional view taken along the line A-A in FIG. 2 of the relative position of the pipe section and the pipeline.
Figure 6:
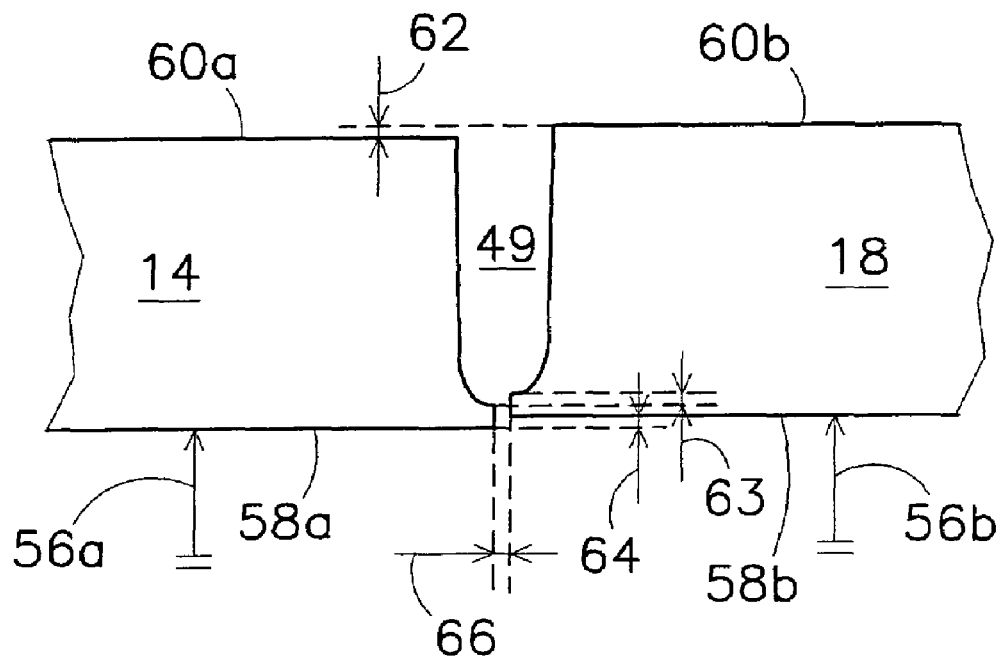
FIG. 6 is a detailed side view of the relative positions of a first and second pipe section.

Referring to FIGS. 5 and 6, the pipe section 14 and the pipeline 18 generally do not have ideal dimensions and ideal positions relative to one another. Variations in the respective diameters 56a, 56b, the roundness, wall thicknesses 54a, 54b occur in both ends 19, 20 of the pipe section 14 and the pipeline 18. Also, deviations in the straightness of the pipe ends 19, 20 and in the flatness and perpendicularity of the end faces 44a, 44b before beveling of the pipe sections 14, 18 may occur. In FIG. 5, the ends 19, 20 of the pipe section 14 and the pipeline 18 do not fit exactly onto one another. A radial distances 62 between the respective outer walls 60a, 60b, a radial distance 63 between the nose tips 46a, 46b and a radial distance 64 of the inner walls 58a, 58b may result, causing eccentric transitions in the pipe wall of the resulting pipeline at a connection of two pipe sections. The distances 62, 63 and 64 may also be referred to as position differences between the points.

An eccentric transition in the outer walls 60a, 60b may exist, the outer walls 60a, 60b being misaligned with one another by an distance 62, 63 over at least a part of the circumference of the pipeline 18. The outer radial distance 62, 63 may be measured at the outer walls 60a, 60b or at the nose tips 46a, 46b. The inner walls 58a, 58b may be non-aligned with one another by an inner radial distance 64 over at least a part of the circumference of the pipeline 18. The inner radial distance 64 may be measured at the inner walls 58a, 58b or be calculated from distance 63 measured at the nose tips 46a, 46b. In the latter case, either an average nose tip thickness 47a, 47b is added to the calculation or a series of values of nose tip thicknesses 47a, 47b measured at specific points around the circumference of the pipe is added to the calculation.

The outer and inner distance 62, 63 and 64 have a strong influence on the life expectancy of the resulting pipeline 18, because they may lead to local stress concentration in the final connection between the pipeline and the pipe section, which stress concentrations can result in an increased fatigue damage. Fatigue of a weld 34 is of extreme importance in the life expectancy of riser sections 15, as discussed hereinabove. In such riser sections 15, tolerated outer and inner distances 62, 63 and 64 may be restricted to 0.5 mm in order to ensure minimal fatigue and a sufficient life expectancy.

At present, the positioning of the pipe section 14 relative to the pipeline 18 prior to the welding is a manual process performed by specialist personnel. Therefore, the positioning is dependent on skill, experience and interpretation of the personnel and subject to human errors.

Currently, position measurements on the pipe section 14 and the pipeline 18 are performed on the outside of the nose tips 46a, 46b. However, the welding groove 49 is narrow (6-8 mm) and relatively deep (15-40 mm). Therefore, the measuring process is very difficult. In particular during the construction of riser sections 15, the positioning process is very time consuming due to the low permitted tolerances in the distances 62, 63 and 64.

Figure 7:
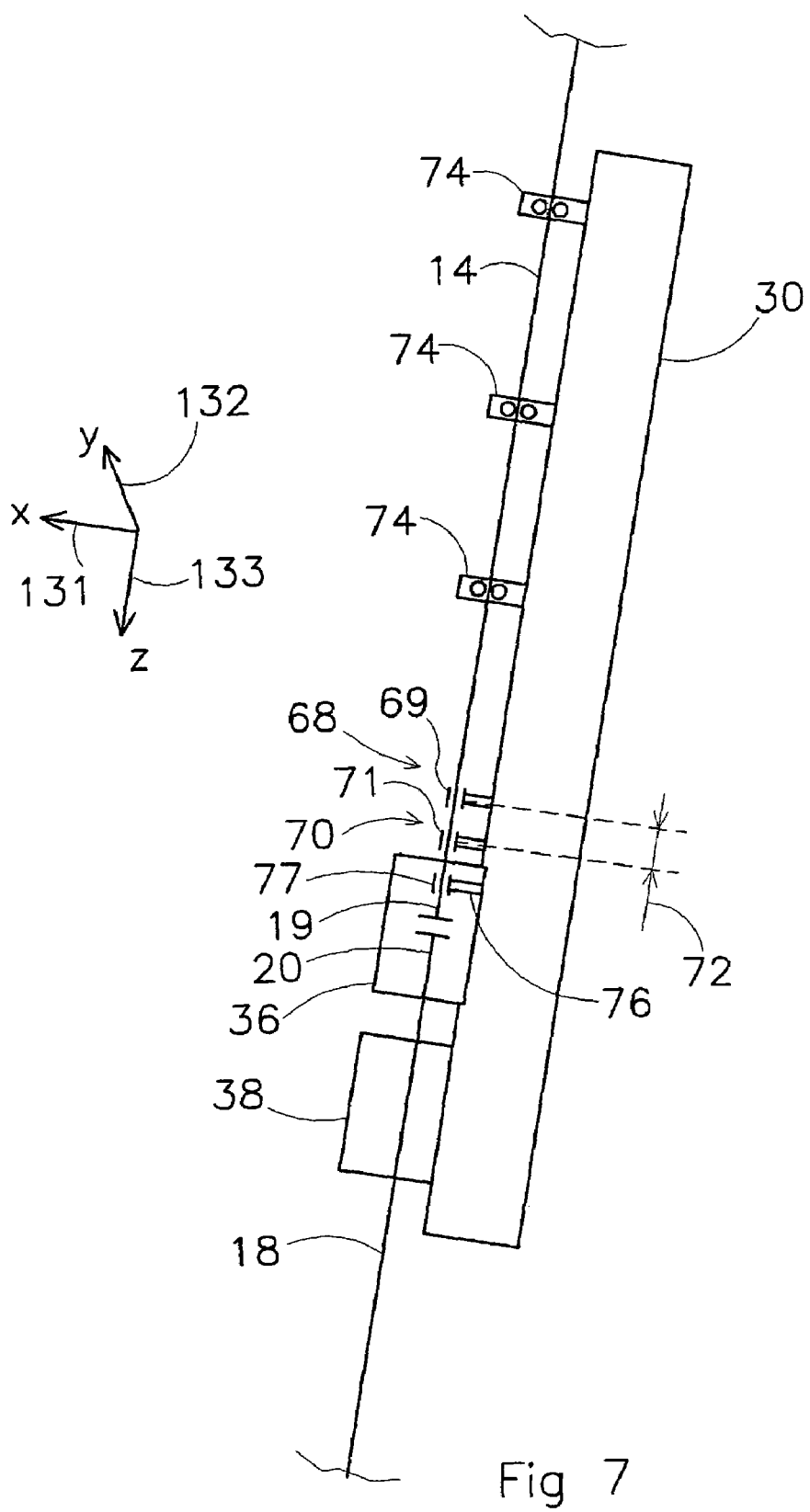
FIG. 7 is a schematic side view of a J-lay tower.
Figure 8A:
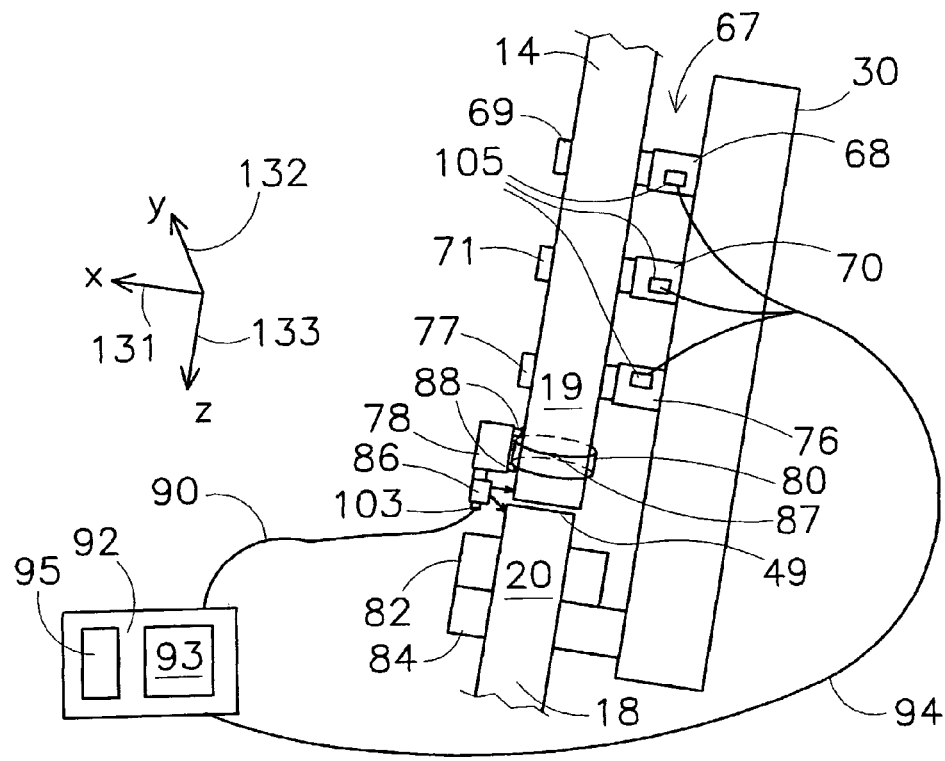
FIG. 8B is a schematic axonometric view of a sensing device mounted to a pipe section.
Figure 8B:
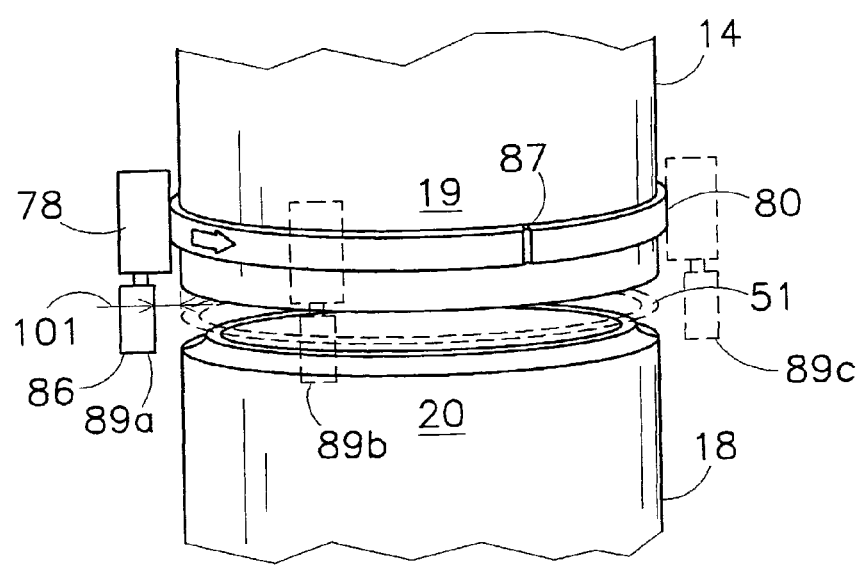

Turning to FIGS. 7, 8A and 8b, manipulators 68, 70 are mounted to the J-lay tower 30 at a distance 72 from one another and are capable of gripping the pipe section 14 with respective grippers 69, 71. The grippers 69, 71 are movable independently from one another in the x-direction and y-direction and can be moved simultaneously in the z-direction.

Guiding organs in the form of rollers 74 which are mounted to the J-lay tower 30 support the pipe section 14 at an upper part thereof in the x-direction and y-direction, while allowing a movement in the z-direction and a rotation about the z-axis of the pipe section 14. Relatively small movements in the x-direction and y-direction of the lower end 19 of the pipe section 14 are allowed by the rollers 74.

A rotation of the pipe section 14 about the x-axis is performed by moving the manipulators 68, 70 opposite to one another in the y-direction. A rotation of the pipe section 14 about the y-axis is performed by moving the manipulators 68, 70 opposite to one another in the x-direction. A translation of the lower pipe end 19 in the x-direction is obtained by moving the manipulators 68, 70 simultaneously in the x-direction. A translation of the lower pipe end 19 in the y-direction is obtained by moving the manipulators 68, 70 simultaneously in the y-direction.

When the manipulators 68, 70 are moved in an opposite direction in order to perform a rotation about the x-axis or y-axis, a translation of the lower pipe end 19 may also occur, which can be corrected by a simultaneous movement of the manipulators 68, 70 in a same direction.

For performing a rotation of pipe section 14 about the z-axis, a third manipulator 76 is provided comprising a third gripper 77. In order to rotate the pipe section 14 about the z-axis, first and second grippers 69, 71 are released, while gripper 77 is engaged.

During a rotation of the pipe section 14 about the x-axis or y-axis, gripper 77 is released.

Instead of the arrangement of three manipulators 68, 70, 76 described here before, it is also possible to use one manipulator having six degrees of freedom, i.e. being capable of moving the pipe section 14 in the x, y and z-direction, and rotating the pipe section 14 about the x, y and z-axis.

Referring to FIGS. 8A and 8B, a sensing device 86 is connected to a carriage 78 which comprises wheels 88 and is mounted for rotation on an annular guide rail 80. The guide rail 80 is preferably mounted to the lower end 19 of the pipe section 14, but may also be mounted to the upper end 20 of the pipeline 18. The pipeline 18 comprises a support organ 82 in the form of a collar on the pipeline 18, which is supported by a hang-off table 84. The guide rail 80 is mounted parallel to the circumferential welding groove 49.

Preferably, the guide rail 80 and carriage 78 are also used in a later stage for moving a welding torch (not shown) around the pipeline 18, for performing the welding operation.

In use, the carriage 78 moves along guide rail 80, while automatically measuring a position of the carriage 78 relative to a reference point 87 on the guide rail. This carriage position may be measured by a known method, for instance by measuring the revolutions of the wheel 88. At a number of different positions of the carriage 78, sensing device 86 automatically measures the position of different points on the end 19 of the pipe section 14 and the end 20 of pipeline 18, which will be further explained hereinafter.

A signal relating to the performed measurements is generated by the sensing device 86 and transmitted via cable 90 to a control unit 92. The control unit 92 comprises a storage means 95 in order to store the performed measurements. When a full revolution of sensing device 86 has been made, the control unit 92 processes the stored measurements with a data processing means 93 for producing a documented scan. In addition, the data processing means 93 involve an algorithm in order to generate a new target position of the pipe section 14. When the new target position is determined, required translations in the x-direction, the y-direction and/or the z-direction, and required rotations about the x-axis, the y-axis and/or z-axis for the pipe section 14 in order to obtain the new target position are also generated by the control unit 92.

Next, control signals are generated by the control unit 92 on the basis of the required translations and rotations and transmitted via cable 94 to manipulators 68, 70, 76. The manipulators 68, 70, 76 subsequently move the pipe section 14 in order to obtain the new target position.

Referring to FIGS. 9A-9D, a sensing device 86 is shown which uses a laser device 95 configured for emitting a laser beam 96. The laser beam 96 projects a series of reflecting light points 98a, 98b, 98c, 98d on the pipe section 14 and the pipeline 18. The laser beam 96 is guided along an axis 100 which extends essentially transversal to the connection area

51. A substantial number of light points 98*a*, 98*b*, 98*c*, 98*d* may be projected along the axis 100 at regular intervals.

Figure 9A:
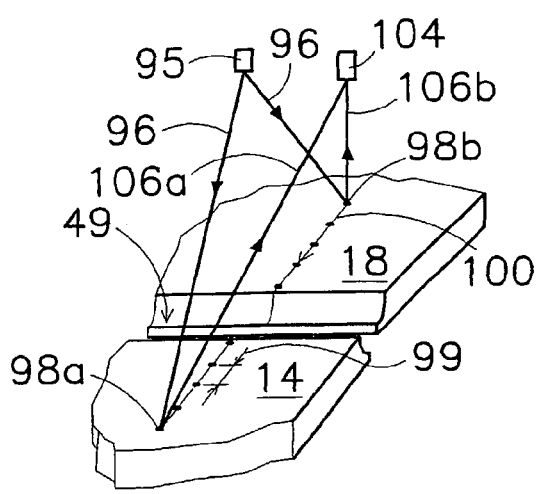
FIG. 9A is a schematic axonometric view of a laser device and a sensor.
Figure 9B:
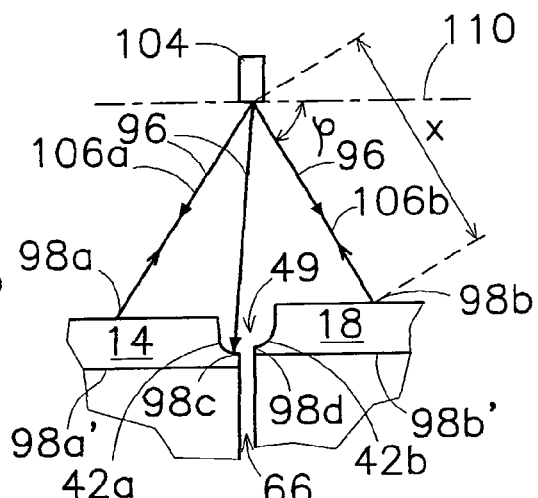
FIG. 9B is a schematic front view of the laser device and the sensor.
Figure 9C:
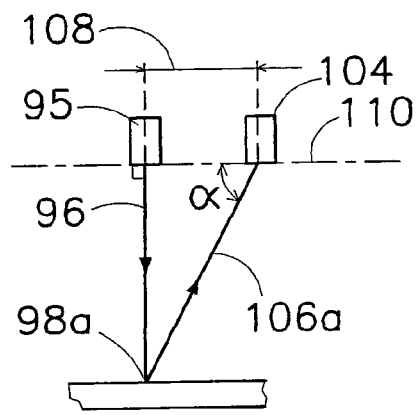
FIG. 9C is a schematic side view of the laser device and the sensor.
Figure 9D:
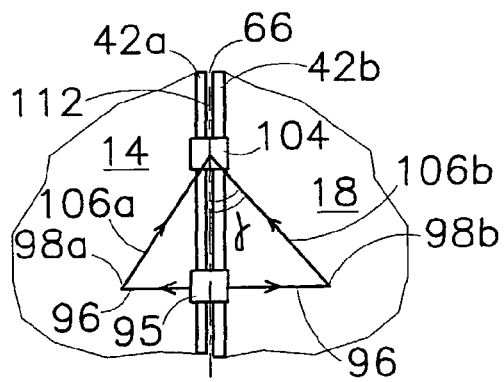
FIG. 9D is a schematic top view of the laser device and the sensor.

The light points 98*a*, 98*b*, 98*c*, 98*d* are detected by a light sensor 104, which detects a reflection 106 of the light point 98. The light sensor 104 measures a first angle a relative to a reference plane 110 shown in FIG. 9C and a second angle γ relative to an axis 112 shown in FIG. 9D. The distance 108 between the laser device 95 and the sensor 104 is known beforehand. An angle f at which the laser beam 96 is emitted from the laser 95 relative to the reference plane 110 is shown in FIG. 9B and is also measured. A distance x shown in FIG. 9 between the light point 98*a* and the laser device 95 can be determined from the angles a, γ, f, and the distance 108. Hence, the exact position of light points 98*a*, 98*b*, 98*c*, 98*d* relative to the location of the laser device 95 can be determined.

Typically, the laser beam 96 is moved transversally to the welding groove 49, wherein the light points 98*a*, 98*b*, 98*c*, 98*d* are located at intervals of 0.01-0.5 mm relative to one another.

Other methods of performing the measurements are also possible, for instance using a mechanical sensing device.

Figure 10:
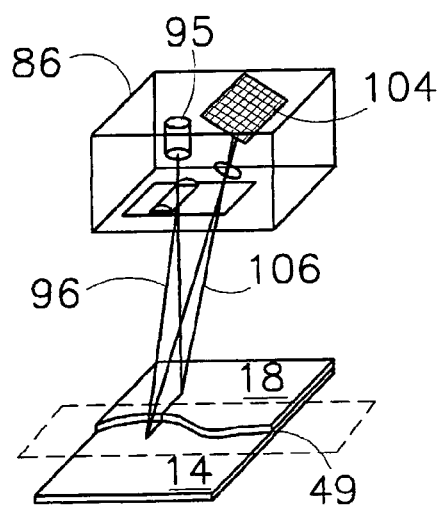
FIG. 10 is a schematic view of another embodiment of the laser device comprising the sensor.
Figure 11:
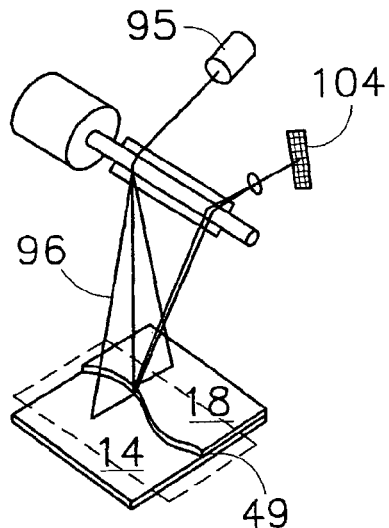
FIG. 11 is a schematic view of another embodiment of the laser device comprising a sensor.

Referring to FIGS. 10 and 11, different embodiments of the combination of a laser device 95 and a sensor 104 are shown, the shown embodiments being commercially available on the market.

Figure 12A:
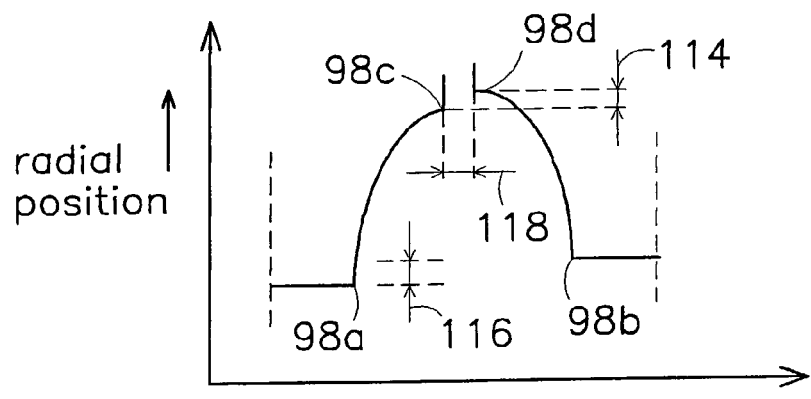
FIG. 12A shows a profile of the position of the pipeline and the pipe section measured from the outside.
Figure 12B:
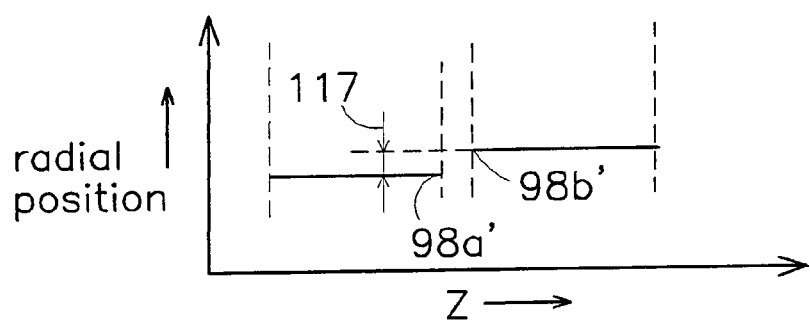
FIG. 12B shows a profile of the position of the pipeline and the pipe section measured from the inside.
Figure 12C:
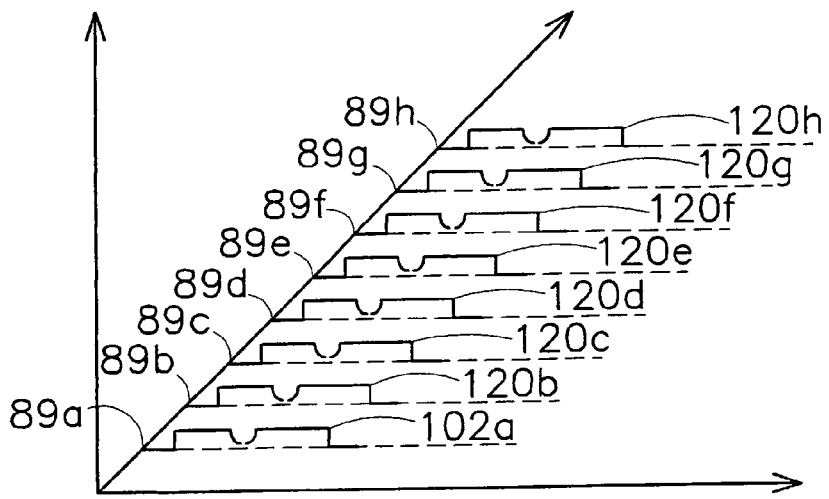
FIG. 12C shows a series of profiles measured at intervals along the circumference of the pipeline and the pipe section.

Referring to FIGS. 12A, 12B and 12C, a measured profile 120 is composed of a series of measured point positions 98*a*, 98*b*, 98*c*, 98*d* along an axis 100 at a location 89. Distances 62, 63 and 66 shown in FIG. 6 can be determined from the profile 120. FIG. 12A shows a measured distance between the pipe wall and the sensing device 86 at a sensing device location 89*a*, 89*b*, 89*c*. The x-axis represents the position along the axis 100. The y-axis shows the measured distance. FIG. 12B shows the same measurement, when the sensing device 86 is moved inside the pipe section 14 or the pipeline 18. Along the x-axis, the position of the points along the axis 100 is plotted. The y-axis represents the distance between the pipe wall and the sensing device 86.

During the movement of carriage 78 around the circumference of the pipe section 14 and the pipeline 18, for subsequent locations 89*a*, 89*b*, 89*c* of the sensing device 86 a profile 120 according to FIG. 12A can be made, resulting in a series of profiles 120*a* . . . 120*h*, shown in FIG. 12B. The locations 89*a*, 89*b*, 89*c*, etc. may be very close to one another, for instance at intervals of 0.1-1 mm. From this series of profiles 120*a* . . . 120*h*, three other diagrams can be obtained, shown in FIGS. 13*a*, 13*b* and 13*c*.

Figure 13A:
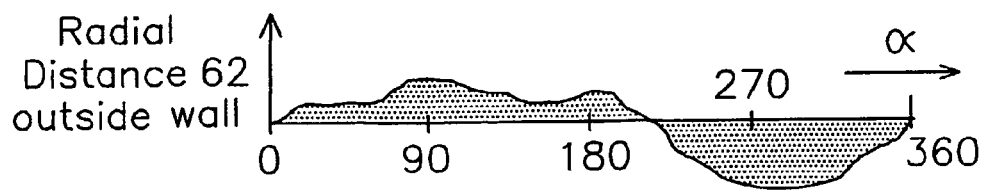
FIG. 13A shows a graph of measured radial distances between points on the respective outer walls of the pipeline and the pipe section along the outer circumference thereof.
Figure 13B:
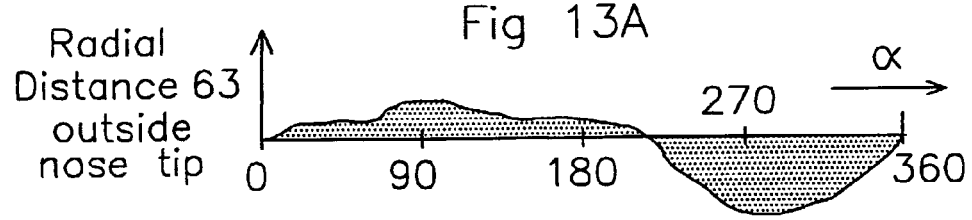
FIG. 13B shows a graph of measured radial distances between points on the respective inner walls of the pipeline and the pipe section along the inner circumference thereof.
Figure 13C:
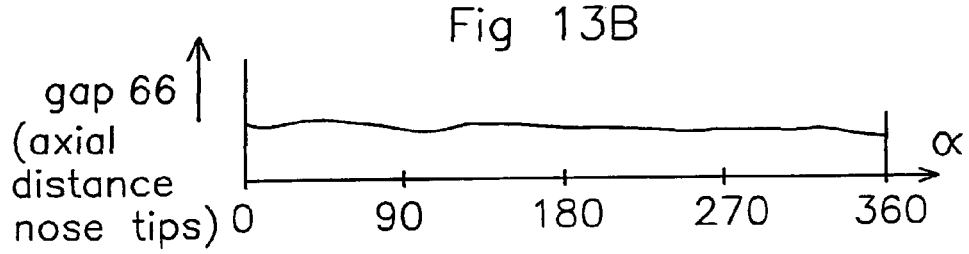
FIG. 13C shows a graph of a measured gap between the pipeline and the pipe section along the circumference thereof.

FIG. 13*a* shows a plot of the distance 62 measured at different locations 89*a*, 89*b*, 89*c* of the sensing device 86 along the circumference of the pipeline 18 and the pipe section 14. FIG. 13*b* shows a plot of the distance 63 of the nose tips 46*a*, 46*b* of the pipeline 18 and the pipe section 14 at different locations 89*a*, 89*b*, 89*c* along the circumference of the pipeline 18 and the pipe section 14. FIG. 13*c* shows a plot of measurements along the circumference of the pipeline 18 and the pipe section 14 relating to a gap 66.

In use, the plots of FIGS. 13*a*, 13*b*, and 13*c* are processed by the data processing means 93 of the control unit 92 in order to determine a new target position. Different optimization algorithms may be used by the control unit 92.

For instance, from FIG. 13*a*, required translations of the pipe section 14 in the x-direction and the y-direction may be obtained leading to a reduction in the average distance 62. Alternatively, from FIG. 13*b*, translations of the pipe section 14 in the x-direction and y-direction may be obtained leading to a reduction in the average distance 63.

The plot of FIG. 13*c* may be used to rotate the pipe section 14 about the x-axis and y-axis in order to position the end faces 44*a*, 44*b* parallel to one another, i.e. in a relative position wherein the gap 66 is the same along the circumference of the pipeline 18 and the pipe section 14. Further, from plot 13*c* a required translation in the z-direction for pipe section 14 may be obtained in order to close the gap 66.

It is also possible to determine translations of the pipe section 14 in the x-direction and y-direction which lead to a minimum peak value of the outer or inner distance 62, 63 of plots 13A and/or 13B. Also, it is possible to determine translations of the pipe section 14 in the x-direction and y-direction which lead to a minimum integrated value of the outer or inner distances 62, 63, 64 over the circumference or a part thereof of the pipeline 18 and the pipe section 14. Other optimization criteria or schemes are also possible.

At least one of the ends 19, 20 of the pipe sections 14, 18 may be circular. In that case the angle of rotation of the pipe section 14 about the z-axis is not relevant. The positioning of the pipe section 14 relative to the pipe line 18 is performed as follows.

First, the end 19 of the pipe section 14 is positioned near the end 20 of the pipeline 18 at a distance of approximately 2-3 mm from the end face 44*a* of the pipeline 18. Subsequently, the pipe section 14 is rotated about the x-axis and the y-axis in order to position the end faces 44*a*, 44*b* parallel with one another. In a next step, the pipe section 14 is moved in the x-direction and/or y-direction to a target position in order to minimize the distances 62, 64. Finally, the gap 66 is closed by a movement of the pipe section 14 in the z-direction.

It is also possible that neither of the pipeline 18 and the pipe section 14 is perfectly circular. In that case, the positioning of the pipe section 14 relative to the pipeline 18 may also comprise a rotation of the pipe section 14 about the z-axis, in order to find smaller distances along the circumference of the resulting pipeline 18.

It is also possible that the pipe section 14 on which guide rail 80 is fitted is not perfectly circular, leading to a non-circular shape of the guide rail 80 itself. In that case, the trajectory which carriage 78 follows along the circumference of the pipeline 18 and the pipe section 14 is not known exactly, and the position of the sensing device 86 during each measurement is not known. If a series of profiles is determined in this situation, only relative positions of the pipe ends 19, 20 can be derived from the profiles 120*a* . . . 120*h*. When absolute positions of the pipe ends 19, 20 are required—which is the case when the alignment procedure involves also a rotation about the z-axis—it is necessary to know the position of the sensing device 86.

Two options are available in order to determine the unknown position of the sensing device 86. First, the form of the end 19 of pipe section 14 on which the guide rail 80 is mounted may be determined beforehand. This form may be stored as form data in the storage means 95 of the control unit 92. The position of the sensing device 86 can be determined by the data processing device 93 from the position of the sensing device 86 relative to the reference point 87 and the stored form data.

Figure 13D:
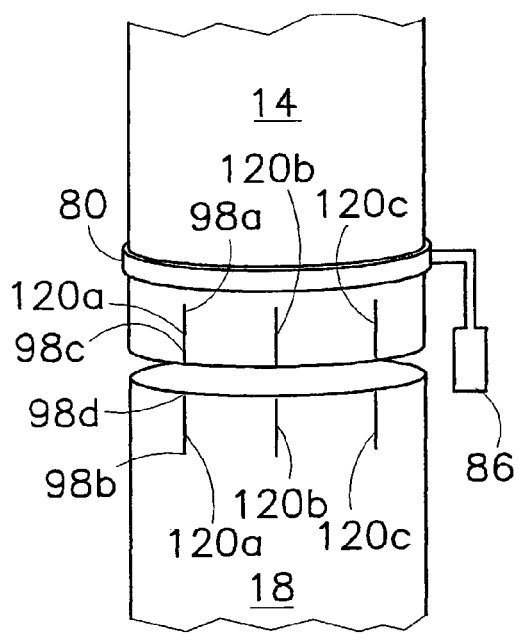
FIG. 13D shows a series of profiles prior to a rotation of the pipe section.
Figure 13E:
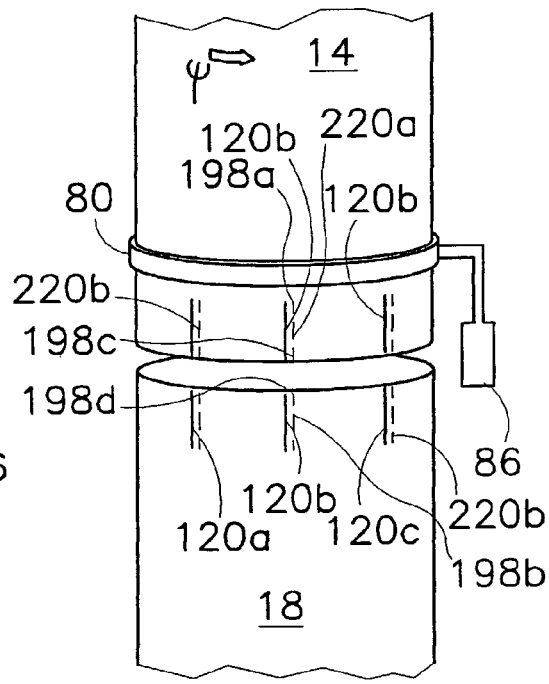
FIG. 13E shows a series of profiles after a rotation of the pipe section.

Referring to FIGS. 13D and 13E, it is also possible to perform a first series of measurements resulting in a first series of profiles 120a . . . 120h, shown in FIG. 13D. In relation to this first series 120a . . . 120h, it is known that point positions 98a, 98c are located on pipe section 14 and point positions 98b, 98d are located on pipeline 18.

In a next step, shown in FIG. 13E, the pipe section 14 is rotated about the z-axis over a predetermined angle of rotation Ψ (shown as a double arrow in FIG. 13E). Thus, the part of profile 120a on pipe section 14 is shifted and is now located opposite to a part of profile 120b on pipeline 18 (or opposite to 120c, 120d . . . etc, depending on angle Ψ).

Subsequently, a second run of the sensing device 86 around the circumference of the pipe section 14 and the pipeline 18 is performed, in which a second series of profiles 220a . . . 220h (indicated in dashed lines in FIGS. 13D and 13E) is determined, each profile 220a . . . 220h being composed of points 198a, 198b, 198c, 198d. For clarity purpose, the profiles 220a . . . 220h are shown adjacent the profiles 120a . . . 120h, but a person skilled in the art will understand that the two series of profiles in fact overlap. In the second run, profile 220a is measured at the location of profile 120a on pipe section 14 and at the location of profile 120b on pipeline 18 of the first run.

Point positions 198b, 198d on pipeline 18 of profile 220a therefore are equal to point positions 98b, 98d of profile 120b on pipeline 18. Also, point positions 198a, 198c on pipe section 14 of profile 220a are equal to point positions 98a, 98c of pipe section 14 of profile 120a.

The measurement data obtained in the two runs are combined, and in this way the previously unknown form and position of pipeline 18 can be resolved and is thus known. Also, the form and position of the guide rail 80 can be resolved. Subsequently, the form and position of the pipe section 14 can be resolved.

After the absolute form and positions of the pipe ends 19, 20 have been calculated along this procedure, a target position may be determined by control unit 92.

Figure 14:
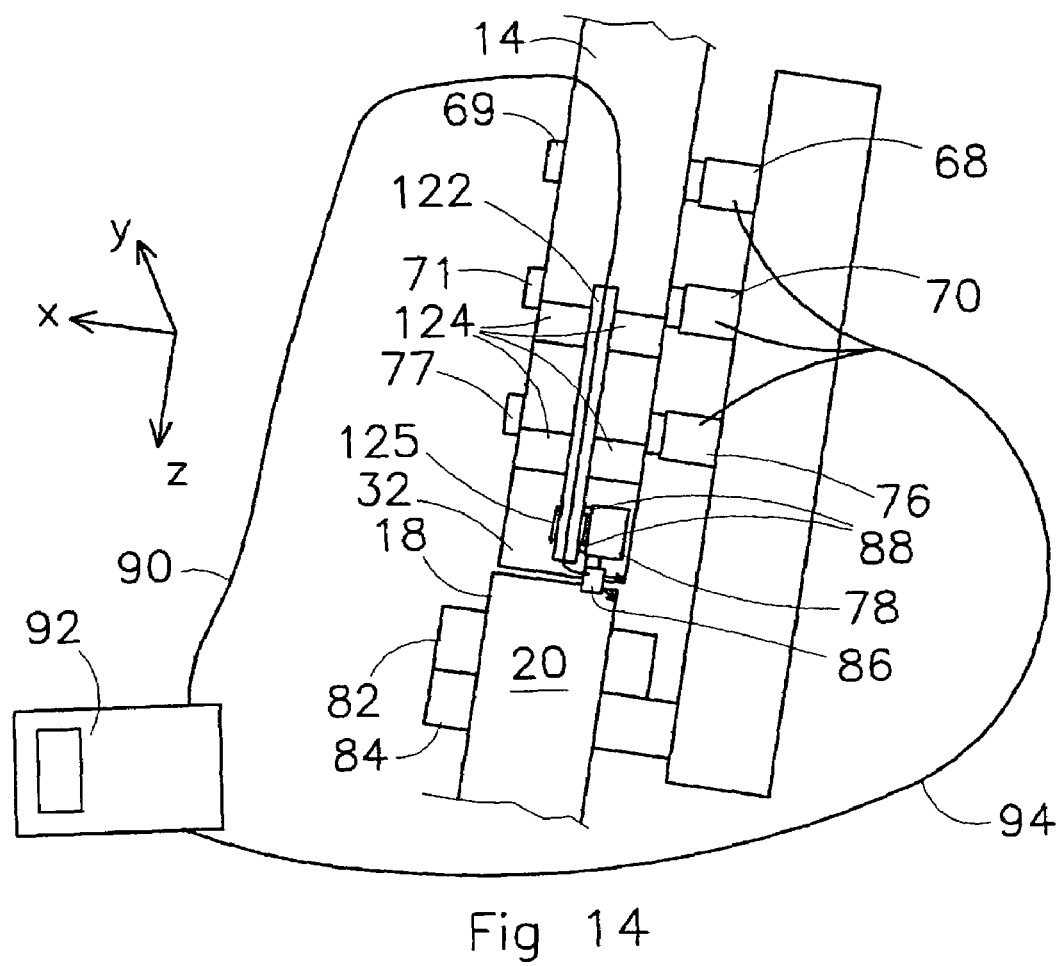
FIG. 14 is a schematic side view of an alternative embodiment according to the invention.

Referring to FIG. 14, the sensing device 86 is mounted for rotation inside pipe section 14. For this purpose, an internal support tool 122 is positioned inside the pipe section 14 and fixed thereto by internal fixation means 124. The internal support tool supports a circular guide rail 125 on which the carriage 78 is movably mounted via wheels 88. The sensor 86 is mounted to the carriage 78.

In use, the carriage 78 rotates along the inner circumference of the pipeline 18 and the pipe section 14. The profiles 120a . . . 120h are determined from the inner side 48, and comprise points on the inner walls 58a, 58b comprising in particular the nose tips 46a, 46b.

The cable 90 extends between the sensing device 86 and the control unit 92 via the internal support tool 122 through the pipe section 14.

An advantage of performing the measurements from the inside of the pipe section 14 is, that the guide rail 125 does not engage the pipe end 19, enabling the form of the guide rail 125 to be exactly circular. In this way, extra unknown variables due to a deformation of the guide rail 125 itself are avoided.

It will be obvious to a person skilled in the art that the details and the arrangement of the parts may be varied over considerable range without departing from the spirit of the invention and the scope of the claims.

What is claimed is:

1. A method for positioning an end of a pipe section relative to an end of a pipeline, the end being supported above the water line by a pipeline laying vessel, the pipeline being suspended from said vessel and extending from the pipeline laying vessel to a seabed, the method comprising:
   (a) prepositioning the end of the pipe section near the end of the pipeline, defining a connection area comprising the respective ends of the pipe section and the pipeline;
   (b) performing a measuring process comprising a plurality of measuring steps, each measuring step comprising:
   (b1) moving a sensing device relative to the pipe section and the pipeline to a location near the connection area,
   (b2) automatically measuring the location of the sensing device relative to a reference location;
   (b3) automatically measuring point positions of points on the ends of the pipe section and the pipeline relative to the sensing device location, wherein the measuring takes place directly on the pipe section and the pipeline;
   (c) determining a target position of the end of the pipe section relative to the end of the pipeline on the basis of the measured point positions; and
   (d) moving the pipe section or the pipeline in order to obtain the target position.

2. The method of claim 1, wherein at least one step (c) comprises: determining one or more deviations of the form of the end of the pipe section relative to an ideal form of said end and determining one or more deviations of the form of the end of the pipeline relative to an deal form of said end and determining the target position using the determined deviations.

3. The method of claims 1, wherein step (a) comprises connecting an annular rail to the pipe section or pipeline, the sensing device being connected to the rail for movement along the connection area.

4. The method of claim 1, wherein at least one step (b) comprises measuring a first point position on the end of the pipe section and measuring a second point position on the end of the pipeline, the first and second points being located opposite one another on either side of the connection area, wherein a subsequent step (c) comprises determining for each sensing device location a distance between the first point position and the second point position and determining the target position on the basis of the determined distances.

5. The method of claim 4, wherein said distance is chosen from a group of distances, comprising:
   a radial distance between a first point on an outer wall of the pipe section and a second point on an outer wall of the pipeline;
   a radial distance between a first point on a nose tip of the pipe section and a second point on a nose tip of the pipeline and
   a radial distance between a first point on an inner wall of the pipe section and a second point on an inner wall of the pipeline; and
   a distance parallel to a central longitudinal axis between a first point on the pine section and a second point on the pipeline.

6. The method of claim 1, wherein the points are situated on the respective pipe ends at intervals from one another along an axis which extends substantially transversally to the connection area.

7. The method of claim 1, wherein at least one step (b) comprises moving the sensing device at a substantially fixed distance from an outer or inner wall of the pipe section or pipeline along said wall.

8. The method of claim 1, wherein at least one step (c), in particular a first step (c), comprises determining a target position wherein an end face of the pipe section is substantially parallel to an end face of the pipeline.

9. The method of claim 1, wherein at least one step (c) comprises:
(c11) determining different candidate target positions;
(c12) determining an optimization value for each candidate target position; and
(c13) comparing the respective optimization values with a criterion and selecting the target position from the candidate target positions on the basis of the results of the comparison.

10. The method of claim 9, wherein the criterion is chosen from a group of target, comprising:
minimizing radial distances between the first points on the outer wall of the pipe section and the second points on the outer wall of the pipeline at the respective locations;
minimizing radial distances between the first points on the inner wall of the pipe section and the second points on the inner wall of the pipeline at the respective measurement locations; and
minimizing a group of radial distances, the group comprising the radial distances between the points situated on the inner wall of the pipe section and the corresponding points situated on the inner wall of the pipeline at the respective measurement locations and the radial distances between the points situated on the outer wall of the pipe section and the corresponding points situated on the outer wall of the pipeline at the respective measurement locations,.

11. The method of claim 1, wherein at least one step (c) comprises:
determining a first form of the end of the pipe section and determining a second form of the end of the pipeline, determining the position of the first form relative to the second form, and determining the target position on the basis of the first and second form and the relative positions thereof.

12. The method of claim 1, wherein at least one step (c) comprises:
(c1) providing thickness data relating to a thickness of the pipe walls or the nose tip walls of the respective first and pipelines;
(c2) determining, on the basis of the wall thickness data or nose thickness data, for each sensing device location a position of a first opposite point located on an opposite side of the pipe wall or nose tip wall from the first point, and determining a position of a second opposite point located on an opposite side of the pipe wall or nose tip wall from the second point; and
(c3) determining the target position on the basis of the first and second opposite point positions or on the basis of a combination of the first and second point positions and the first and second opposite point positions.

13. The method of claim 1, wherein in at least one step (c) a target position is selected which has: a minimal peak value of the radial distances at the respective sensing device locations, a minimal sum of the radial distances at the sensing device locations, or a minimal integral of the radial distances over at least a part of the circumference of the first and pipeline.

14. The method of claim 1, wherein at least one step (d) comprises moving the at least one of the first and pipelines in a manner, chosen from a group of movements, comprising: a movement of the pipe section or pipeline in a direction substantially parallel to a central longitudinal axis of said pipe section or pipeline, a movement of the pipe section or pipeline in a direction substantially transversal to the central longitudinal axis of said pipe section or pipeline, a rotation of the pipe section or pipeline about a first axis extending substantially transversally to the central longitudinal axis of said pipe section or pipeline, and a rotation of the pipe section or pipeline about a second axis extending substantially parallel to the central longitudinal axis of said pipe section or pipeline.

15. The method of claim 1, further comprising performing step (b) two times, wherein between the first step (b) and the second step (b) at least one of the pipe section and pipeline is rotated over a predetermined angle about a central longitudinal axis thereof, wherein in the first step (b) a first series of point positions is obtained, and wherein in the second step (b) a second series of point positions is obtained, and wherein step (c) comprises combining the first series of point positions with the second series of point positions for determining the target position.

16. The method of claim 1, wherein in at least one step (d), in particular in a final step (d), at least one of the pipe section and pipeline is moved in order to close a gap between the pipe section and pipeline.

17. A pipeline laying vessel comprising a positioning system for positioning an end of a pipe section relative to an end of a pipeline, the pipeline laying vessel being configured to support the end above the water line such that the pipeline is suspended from said vessel and extends from the pipeline laying vessel to a seabed, the positioning system comprising:
a support device configured for positioning the end of the pipe section near the end of the pipeline, defining a connection area comprising the respective ends of the pipe section and pipeline, the support device comprising:
at least one moving device configured for moving the pipe section and/or the pipelines; and
an input organ for input of a signal relating to a target position to which at least one of the pipe section and pipeline is to be moved, the input organ being coupled to the moving device;
a sensing device configured for movement relative to the pipe section and pipeline to different locations of the connection area, the sensing device being configured for automatically measuring each sensing device location relative to a reference location, wherein the sensing device is configured for automatically measuring point positions relative to the sensing device of different points on the ends of the pipe section and the pipeline at each sensing device location, the sensing device being configured to measure directly on the pipe section and the pipeline, wherein the sensing device comprises an output organ for output of the measured point positions and the measured sensing device locations; and
a target position determining means being configured for input of the point positions and being configured for determining the target position on the basis of the point positions, the target position determining means further being configured for output of the target position.

18. The pipeline laying vessel of claim 17, wherein the target position determining means is configured for determining one or more deviations of the form of the end of the pipe section relative to an ideal form of said end and determining one or more deviations of the form of the end of the pipeline relative to an ideal form of said end and determining the target position using the determined deviations.

19. The pipeline laying vessel of claim 17, wherein the target position determining means comprises a data processing means configured for processing the point positions and performing the following steps:
(c11) determining different candidate target positions;
(c12) determining an optimization value for each candidate target position; and
(c13) comparing the respective optimization values with a criterion and selecting the target position from the candidate target positions on the basis of the results of the comparison.

20. The pipeline laying vessel of claim 17, wherein the target position determining means is configured to generate a control signal on the basis of the determined target position, the control signal relating to a required movement of the moving device for obtaining the target position, and wherein the target position determining means is coupled via coupling means to the input organ, for controlling the moving device.

21. The pipeline laying vessel of claim 17, wherein the sensing device is configured for emitting a laser beam and sensing the position of a light point projected on the pipe section and the pipeline.

* * * * *

UNITED STATES PATENT AND TRADEMARK OFFICE
CERTIFICATE OF CORRECTION

PATENT NO. : 7,713,000 B2  
APPLICATION NO. : 11/911761  
DATED : May 11, 2010  
INVENTOR(S) : Alexander Lambertus Johannes Verkuijl et al.

Page 1 of 1

It is certified that error appears in the above-identified patent and that said Letters Patent is hereby corrected as shown below:

Column 1, line 21, replace "in and end-to-end" with --in an end-to-end--.

Claim 2, column 16, line 34, replace "relative to an deal" with --relative to an ideal--.

Claim 5, column 16, line 62, replace "pine section" with --pipe section--.

Claim 10, column 17, line 19, replace "group of target" with --group of criteria--.

Claim 13, column 17, line 66, replace "first and" with --pipe section and the--.

Claim 14, column 18, line 2, replace "moving the at least one" with --moving at least one--.

Claim 14, column 18, line 2, replace "first and pipelines" with --pipe section and the pipeline--.

Claim 17, column 18, line 40, replace "and/or the pipelines" with --and/or the pipeline--.

Signed and Sealed this  
Twenty-fifth Day of September, 2012

David J. Kappos  
*Director of the United States Patent and Trademark Office*